US007365781B2

United States Patent
Kubota et al.

(10) Patent No.: US 7,365,781 B2
(45) Date of Patent: Apr. 29, 2008

(54) CAMERA APPARATUS AND METHOD FOR SYNCHRONIZED TRANSFER OF DIGITAL PICTURE DATA AND COMPRESSED DIGITAL PICTURE DATA

(75) Inventors: Kosuke Kubota, Yokosuka (JP); Tadashi Kayada, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 759 days.

(21) Appl. No.: 10/312,339

(22) PCT Filed: Apr. 25, 2002

(86) PCT No.: PCT/JP02/04115

§ 371 (c)(1),
(2), (4) Date: Dec. 26, 2002

(87) PCT Pub. No.: WO02/089470

PCT Pub. Date: Nov. 7, 2002

(65) Prior Publication Data

US 2003/0151671 A1 Aug. 14, 2003

(30) Foreign Application Priority Data

Apr. 27, 2001 (JP) ............................. 2001-130622

(51) Int. Cl.
*H04N 5/76* (2006.01)
*H04N 9/04* (2006.01)
(52) U.S. Cl. ............................. 348/231.9; 348/207.99; 348/231.6
(58) Field of Classification Search ............. 348/231.9, 348/231.6
See application file for complete search history.

(56) References Cited

U.S. PATENT DOCUMENTS 4,888,795 A 12/1989 Ando et al.

(Continued)

FOREIGN PATENT DOCUMENTS

EP 0469852 2/1992

(Continued)

OTHER PUBLICATIONS

Chinese Office Action dated Sep. 10, 2004 with English translation.

(Continued)

*Primary Examiner*—Tuan Ho
*Assistant Examiner*—Hung H. Lam
(74) *Attorney, Agent, or Firm*—Dickinson Wright, PLLC

(57) ABSTRACT

An image signal processor 12 inputs digital picture data 101 into a compressor 13 and into a resolution changer 16 in parallel. The compressor 13 outputs compressed data 102, which is compressed digital picture data 101, to an output 14 through a buffer 17. Meanwhile, a resolution changer 16 outputs the new digital picture data 104, which is the digital picture data 101 with reduced resolution, to the output 14. In accordance with the instruction of a selection signal 108, the output 14 selectively outputs either one of digital picture data 104 with reduced resolution and the buffered compression data 105 as output data 106 through the same signal line at the same signal timing. By this means it is possible to provide a camera apparatus which can simplify circuit configurations of external apparatus that receive digital picture data and compression data and simplify the circuit control.

4 Claims, 6 Drawing Sheets

U.S. PATENT DOCUMENTS

| | | | |
|---|---|---|---|
| 6,018,363 | A | 1/2000 | Horii |
| 6,256,414 | B1 | 7/2001 | Mancuso et al. |
| 6,801,248 | B1 * | 10/2004 | Horiuchi ................. 348/208.13 |
| 6,816,485 | B2 * | 11/2004 | Sato et al. ................... 370/362 |
| 6,859,226 | B2 * | 2/2005 | Kawamura et al. ...... 348/231.3 |
| 6,903,776 | B1 * | 6/2005 | Tsujino et al. ............... 348/362 |
| 7,038,724 | B2 | 5/2006 | Satoh et al. |
| 7,136,097 | B1 * | 11/2006 | Toyoda et al. ........... 348/222.1 |
| 2003/0123859 | A1 * | 7/2003 | Ikeda ......................... 386/120 |
| 2004/0056960 | A1 | 3/2004 | Hayashi |
| 2005/0041132 | A1 * | 2/2005 | Juen et al. ............. 348/333.12 |
| 2005/0062860 | A1 * | 3/2005 | Kuroiwa ................ 348/231.99 |
| 2006/0114330 | A1 * | 6/2006 | Kuroiwa ................ 348/207.99 |

FOREIGN PATENT DOCUMENTS

| | | |
|---|---|---|
| EP | 1083742 | 3/2001 |
| JP | 06315105 | 11/1994 |
| JP | 07322114 | 12/1995 |
| JP | 08331537 | 12/1996 |
| JP | 09023405 | 1/1997 |
| JP | 11027616 | 1/1999 |
| JP | 1141556 | 2/1999 |
| JP | 11032240 | 2/1999 |
| JP | 11112932 | 4/1999 |
| JP | 11261879 | 9/1999 |
| JP | 2000/092365 | 3/2000 |

OTHER PUBLICATIONS

International Search Report dated Aug. 13, 2002.
Japanese Office Action dated Apr. 5, 2005 with English translation.
Supplementary European Search Report dated Oct. 18, 2006.

* cited by examiner

CAMERA APPARATUS AND METHOD FOR SYNCHRONIZED TRANSFER OF DIGITAL PICTURE DATA AND COMPRESSED DIGITAL PICTURE DATA

TECHNICAL FIELD

The present invention relates to a camera apparatus, and in particular, the present invention relates to a camera apparatus suitable for use with a picture communication apparatus having still picture filming functions and moving picture filming functions such as in TV telephones. Furthermore, the present invention relates to an electronic apparatus comprising the camera apparatus typified by picture communication apparatus.

BACKGROUND ART

Over recent years, communication terminals typified by mobile telephones have arrived at still picture filming functions and moving picture communication functions such as in TV telephones by connecting to or incorporating camera apparatus.

Generally, moving picture compression schemes used for bidirectional moving picture communication such as by TV telephones fall under simple profile level 1 by MPEG-4, which is an international standard scheme, and the resolution for corresponding picture data is QCIF (176 pixels*144 lines).

In addition, in terms of the resolution of display devices such as liquid crystal panels mounted in communication terminals typified by mobile telephones, the number of horizontal pixels and the number of vertical lines are both around 100 to approximately 200. Therefore, when moving picture filmed with a camera apparatus is displayed on a display device, QCIF is a sufficient resolution level for the moving picture data.

As thus described, in either case of when a moving picture is compressed by MPEG-4 or when a camera picture is displayed, QCIF is still an adequate resolution level for moving picture data that camera apparatus mounted in communication terminals requires.

Meanwhile, pictures filmed as still pictures can be transferred to personal computers and such and viewed on a display device of higher resolution. So, as with communication terminals typified by mobile telephones too, with respect to still picture filming functions, still picture data should ideally have higher resolution than QCIF, such as VGA (640 pixels*480 lines).

As explained above, although the resolution required for camera apparatus for use with communication terminals is approximately QCIF for moving pictures, higher resolution is yet required as for still pictures. However, if an imaging device of high resolution is used in quality of a camera apparatus in accordance with demand for a resolution for still pictures, and if moving picture data is being used and meanwhile picture data of similarly high resolution is used, the transfer speed of camera output signals increases, which is a factor that leads to increased power consumption. At the same time, on the moving picture data receiver side, an increase in memory capacity occurs correspondingly with high resolution, and as a result, power consumption, cost, and the component area will increase.

As a solution to this problem, there is a technique for compressing and transferring data that is output from camera apparatus recited in Japanese Unexamined Patent Application Publication No.HEI6-315105.

This prior art (hereinafter "the first prior art") employs a configuration comprising an imaging section which changes signals of the filmed object into signals for low-resolution moving pictures and signals for high-resolution still pictures, a compression section which performs moving picture compression and still picture compression, a control section, and a transmission section. The control section instructs the imaging section and the compression section as to the operation mode for moving pictures and for still pictures. The imaging section, following the instruction from the control section, outputs picture signals. The compression section, following the instruction from the control section, performs compression adequate for moving pictures and still pictures respectively and outputs the compressed data to the transmission section. By thus compressing all the data output from the camera apparatus, the transmission speed for camera output signals can be moderated without an increase in memory capacity on the compression data receiver side.

Another technique is disclosed in, for instance, Japanese Unexamined Patent Application Publication No.11-112932, wherein data output from camera apparatus can be chosen between live picture data from an imaging section and compression data such as JPEG.

This prior art (hereinafter "the second prior art") employs a configuration comprising an imaging section, a memory which stores picture data output from the imaging section, a signal processing section which performs color conversion and ã conversion and such, a compression circuit which performs JPEG compression and such, and an external recorder medium. A pathway is provided to directly transfer data from the memory that stores picture data to the external recorder medium; this pathway is used when live picture data from the imaging section is recorded into the external memory medium. In case compression data is recorded into the external recorder medium, the data is supplied from the memory storing picture data to the signal processing circuit, and from the signal processing circuit through the compression circuit, the compression data is recorded into the external recorder medium. By this means, both live picture data and compression data such as JPEG can be obtained from the camera apparatus.

However, as with the apparatus according to the first prior art, both still pictures and moving pictures are compressed. So, when the moving pictures too are compression data to be displayed on communication terminals, a separate circuit is needed to extend the compression data. This results in an increase in the circuit scale and power consumption at the communication terminals.

In addition, with the apparatus according to the second prior art, a number of pathways for recording data into the external recorder medium need to be provided, which results in an increase in the circuit scale of the camera apparatus. In addition, data recording control in respect to the external recorder medium requires several schemes, which makes the processing complex.

SUMMARY OF THE INVENTION

The present invention aims to provide a camera apparatus that can simplify the circuit configuration of an external apparatus that receives digital picture data and that can simplify circuit control, and an electronic apparatus that comprises the camera apparatus.

The above aim can be achieved by inputting digital picture data output from an image signal processor means into a first pathway with a compressor means and another pathway without a compressor means, and by outputting the compression data input through the first pathway via a compressor means and the digital picture data input through another pathway to outside at the same timing through the same signal line.

BEST MODE FOR CARRYING OUT THE INVENTION

With reference to the accompanying drawings now, embodiments of the present invention will be described in detail below.

Embodiment 1

Figure 1:
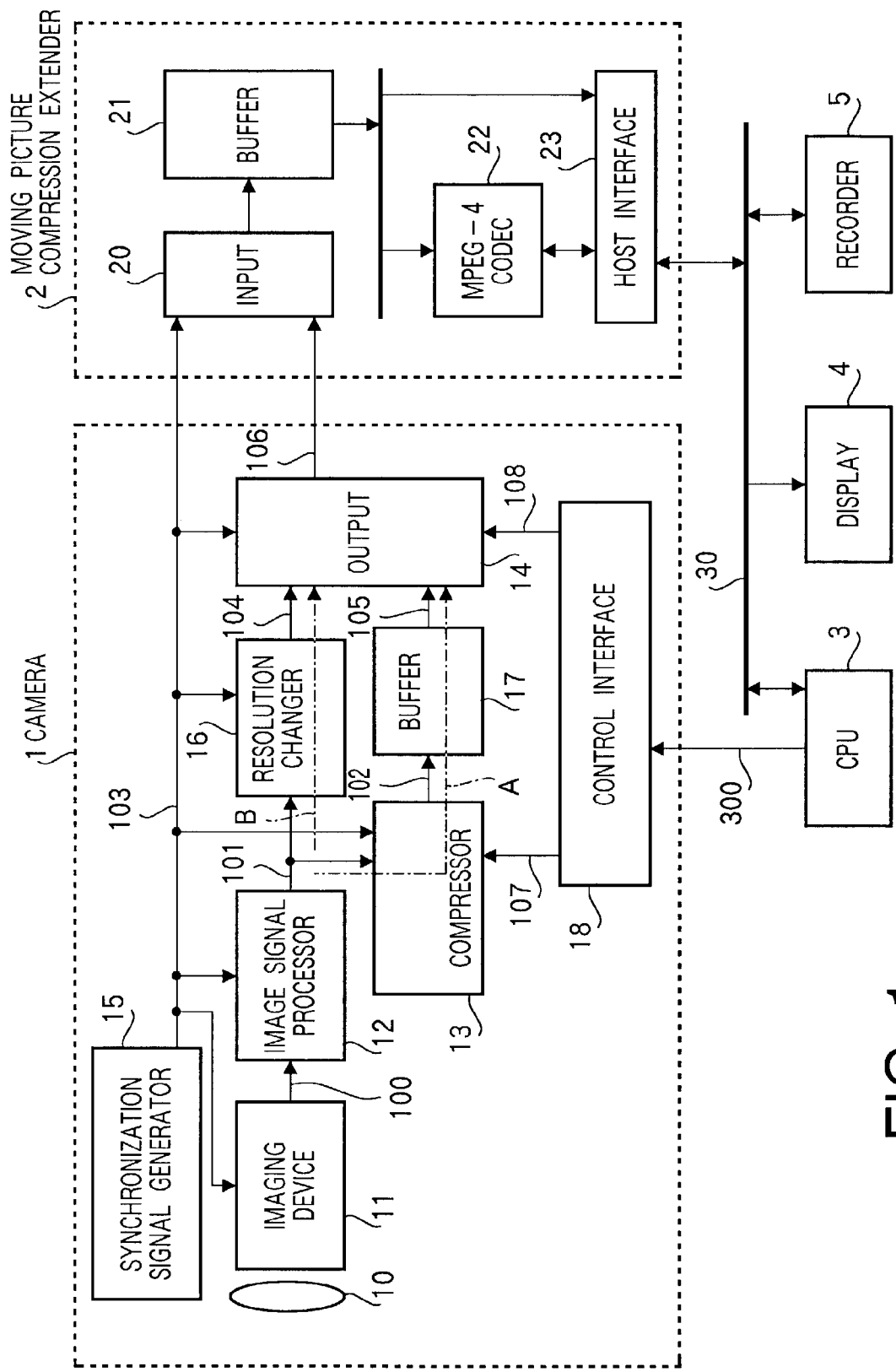
FIG. 1 is a block diagram showing a configuration of an electronic apparatus comprising a camera apparatus according to Embodiment 1 of the present invention.

FIG. 1 is a block diagram showing a configuration of an electronic apparatus comprising a camera apparatus according to Embodiment 1 of the present invention.

The electronic apparatus shown in FIG. 1 is composed of camera 1 that films an object and outputs digital picture data, moving picture compression extender 2 that compresses the digital picture data output from camera 1 and extends the compression data, CPU 3 that controls the entire electronic apparatus, display 4 that displays digital image data, memory 5 that memorizes data, and bus 30 that electrically connects each part.

In camera 1, lens 10 injects the light from the object into imaging device 11. Imaging device 11 photoelectrically converts the injected light and then outputs image signal 100 to image signal processor 12. Image signal processor 12 performs A/D conversion and color conversion and such on video signal 100 to generate digital picture data 101 consisting of luminance data and color difference data and such, which is then output to compressor 13 and resolution changer 16.

Compressor 13 compresses digital picture data 101 by a publicly-known still image compression format such as the JPEG scheme and outputs compression data 102 to buffer 17. Buffer 17 buffers compression data 102, which is then output to output 14.

In addition, resolution changer 16 reduces the resolution of digital picture data 101 and generates new digital picture data 104 with a reduced information volume, which is then output to output 14.

Output 14 chooses either one of digital picture data 104 with reduced resolution and buffered compression data 105, which is then output as output data 106. This choice is made in accordance with the instruction of choice signal 108 from control interface 18 that has received control signal 300 from CPU 3.

Moreover, synchronization signal generator 15 is provided in camera 1. Synchronization signal 103 generated from this synchronization signal generator 15 is input into imaging device 11, image signal processor 12, compressor 13, output 14, resolution changer 16, and into moving picture compression extender 2 that will be described later. Synchronization signal 103 consists of a vertical synchronization signal, a horizontal synchronization signal, a data clock and such.

In moving picture compression extender 2, input 20 inputs output data 106, which has been output from output 14 of camera 1, into buffer 21, whereupon buffer 21 stores the data.

MPEG-4 codec 22 video-codes and compresses digital picture data 104 by MPEG-4 or extends video-coded data into original digital picture data by way of decoding. An MPEG-4 format is employed here; nevertheless, other moving picture compression formats such as H0.263 and MPEG-2 can be employed as well.

Host interface 23 inputs a control signal from CPU 3 into MPEG-4 codec 22 and executes compression, while following control from CPU 3 and transferring the data stored in buffer 21 and the M-PEG data compressed in MPEG-4 codec 22 to display 4 and recorder 5. It is also possible to transfer the MPEG data memorized in recorder 5 to MPEG-4 codec 22 for extension. To be more specific, when the data stored in buffer 21 is digital picture data 104, by control of CPU 3 through host interface 23, this digital picture data 104 is compressed in MPEG-4 codec 22 to realize TV-telephone functions and such. Otherwise, digital picture data 104 is transferred to display 4 for camera picture display.

On the other hand, when the data stored in buffer 21 is compression data 105, the data is transferred by control of CPU 3 through host interface 23 to recorder 5 and memorized.

Data transfer control in an electronic apparatus configured such as above will be described now.

Imaging device 11, image signal processor 12, compressor 13, buffer 17, resolution changer 16, and output 14 output signals in synch with the same synchronization signal 103 generated from synchronization signal generator 15. That is, imaging device 11 outputs image signal 100 that is in synch with synchronization signal 103 generated from synchronization signal generator 15 to image signal processor 12. Image signal processor 12 outputs digital picture data 101 to compressor 13 and resolution changer 16 in parallel in synch with synchronization signal 103.

To be more specific, in camera 1, the first pathway A through compressor 13 and buffer 17 and the second pathway B through resolution changer 16 yet lacking compressor 13 are provided, and digital picture data 101 from video signal processor 12 is input in parallel into the first pathway A and the second pathway B.

Compressor 13 compresses digital picture data 101 and outputs compression data 102 to buffer 17 in synch with synchronization signal 103. Meanwhile, resolution changer 16 also outputs digital picture data 104 to output 14 in synch with synchronization signal 103.

Output 14 outputs either digital picture data 104 or compressed data 105 as output data 106, and in either case, it is output to moving picture compression extender 2 in synch with synchronization signal 103 through the same signal line.

Figure 2:
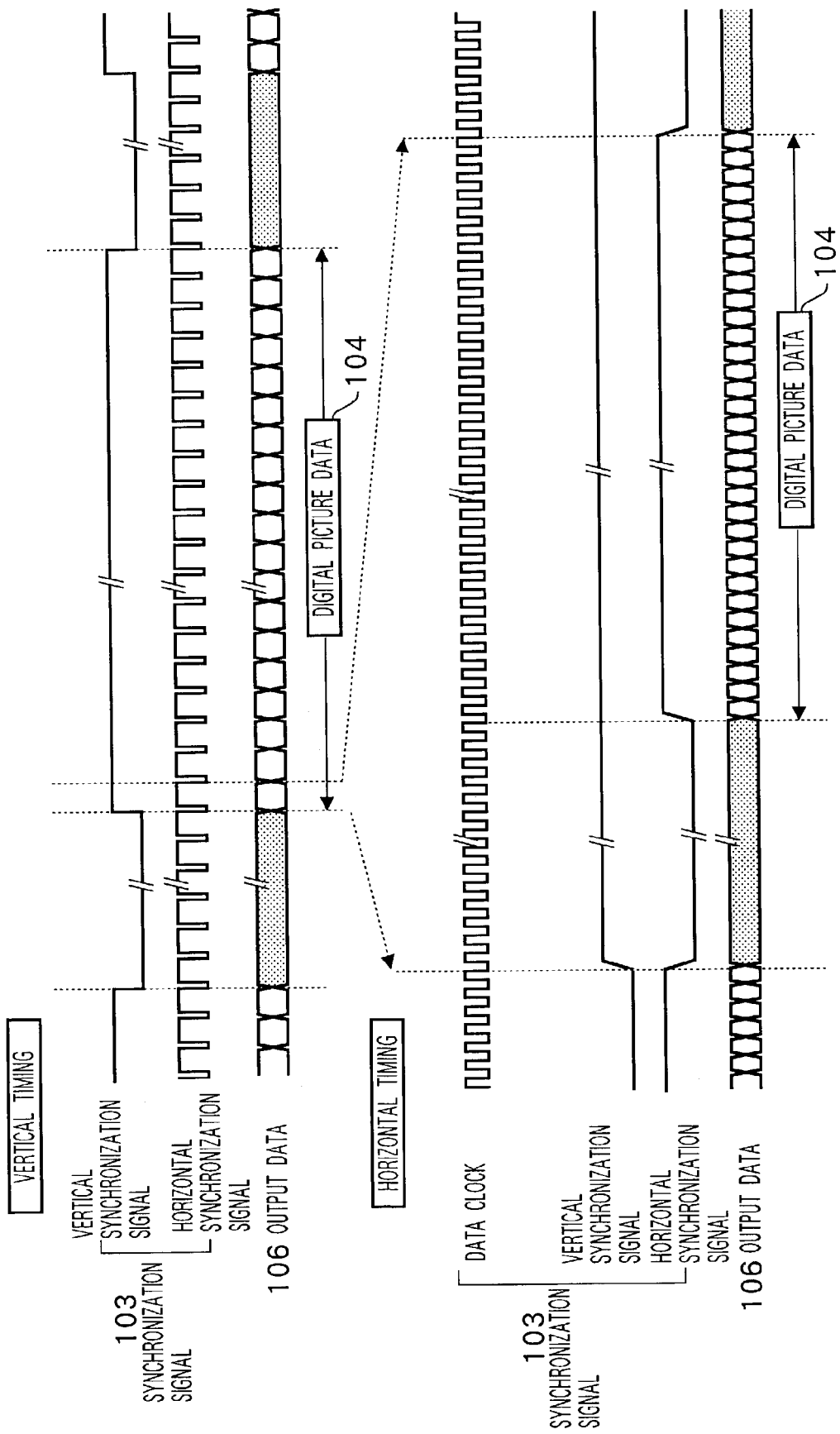
FIG. 2 illustrates an example of a signal timing in a case where digital picture data is output in a camera apparatus according to Embodiment 1.
Figure 3:
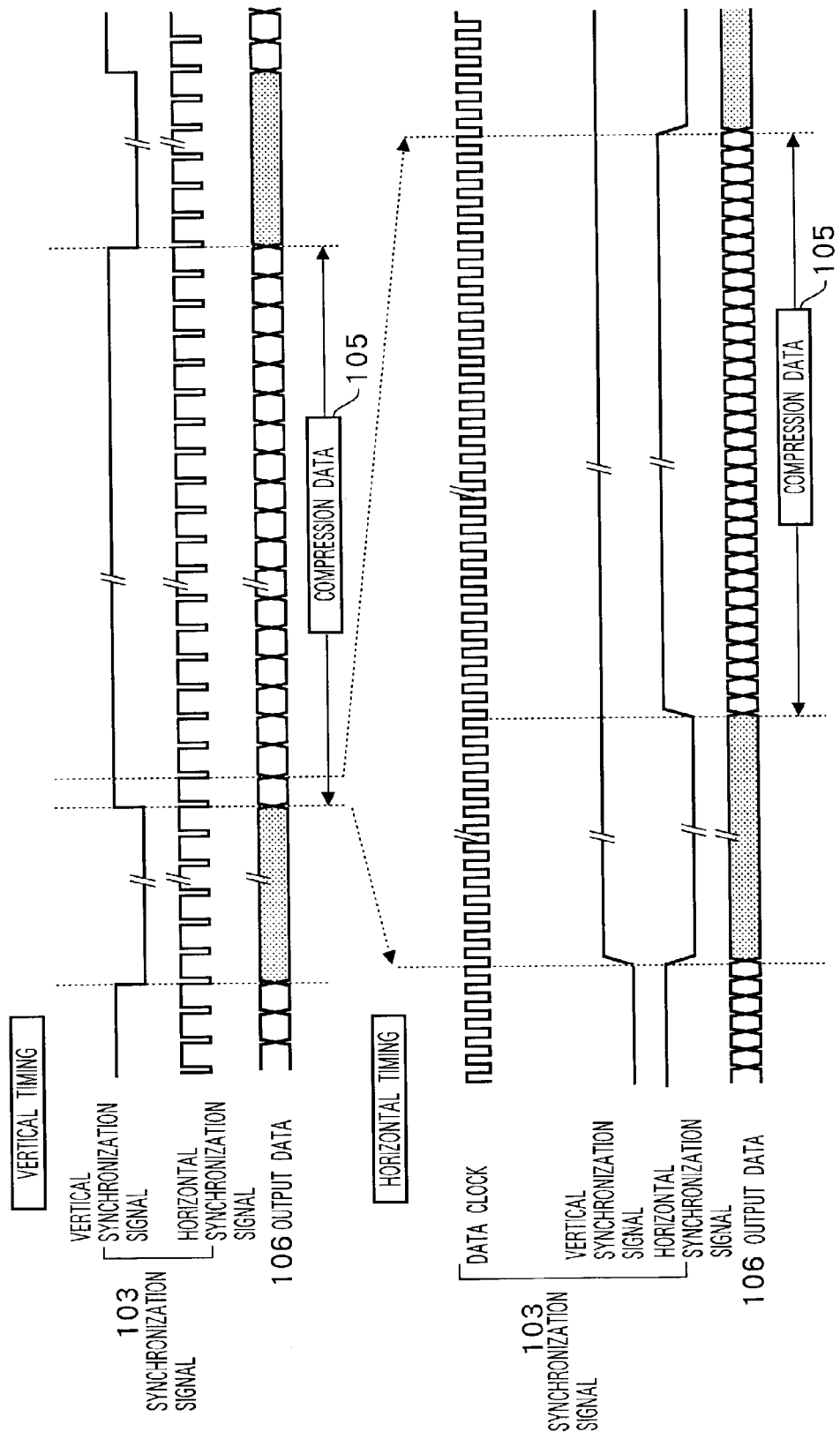
FIG. 3 illustrates an example of a signal timing in a case where digital compression data is output in a camera apparatus according to Embodiment 1.

FIG. 2 and FIG. 3 each show an example of a signal timing of a camera apparatus according to above Embodiment 1. In FIGS. 2 and 3, the horizontal axis represents time. In FIGS. 2 and 3, signals identical to those in FIG. 1 will be assigned the same codes.

FIG. 2 illustrates an example of a signal timing in a case where digital picture data is output in a camera apparatus according to above Embodiment 1. Shown here is a timing that digital picture data 104 is output in synch with synchronization signal 103 (a data clock, a vertical synchronization signal, and a horizontal synchronization signal).

Then, FIG. 3 illustrates an example of a signal timing in a case where digital compression data is output in a camera apparatus according to above Embodiment 1. Shown here is a timing that compression data 105 is output in synch with synchronization signal 103 (a data clock, a vertical synchronization signal, and a horizontal synchronization signal).

As obvious from FIGS. 2 and 3, since output 14 outputs data in synch with the same synchronization signal 103 generated by synchronization signal generator 15 in either case digital picture data 104 or compression data 105 is output, the timing for outputting digital picture data 104 shown in FIG. 2 and the timing shown in FIG. 3 for outputting compression data 105 are identical except for the type of data that is output. As a result of this, without regard to whether output data 106 that is input in synch with synchronization signal 103 is digital picture data 104 or compression data 105, input 20 of moving picture compression extender 2 writes the received output data 106 into buffer 21 through the same circuit and circuit control.

As thus described, with an electronic apparatus comprising camera 1 according to the present embodiment, the circuit configuration and control on the receiver side that receives output data can be unified irrespective of digital picture data 104 or compression data 105, which makes it possible to reduce the circuit scale and simplify the circuit control.

Camera 1 is capable of selectively outputting uncompressed digital picture data 104 and compression data 105 compressed by compressor 13. Consequently, when display 4 displays pictures from camera 1, uncompressed digital picture data 104 is chosen through output 14 and output to moving picture compression extender 2 and transferred to display 4, so that there is no need to provide a means for extending compression data in the electronic apparatus. As a result, reduction in the circuit scale on the receiver side that receives output data 106 and simplification of the circuit control become possible.

Furthermore, if in Embodiment 1 the resolution of imaging device 11 is VG and digital picture data 101 having resolution of VGA is converted into for instance digital picture data 104 having resolution of CIF, the data transfer speed upon outputting digital picture data 104 from output data 106 can be moderated and power consumption can be saved as well.

At the same time, when compression data 105 is output from output data 106, it is possible to output compression data corresponding to pictures of resolution up to VGA by the same timing as when digital picture data 104 is output.

Thus according to camera 1 of Embodiment 1, with simplified arrangement and interface, it is possible to minimize power consumption and obtain moving picture data of adequate resolution for communication terminal apparatus typified by mobile phones and compression data of higher resolution than moving picture data.

As in the present embodiment resolution changer 16 is provided on the second route B; nevertheless, the provision is not essential.

Figure 4:
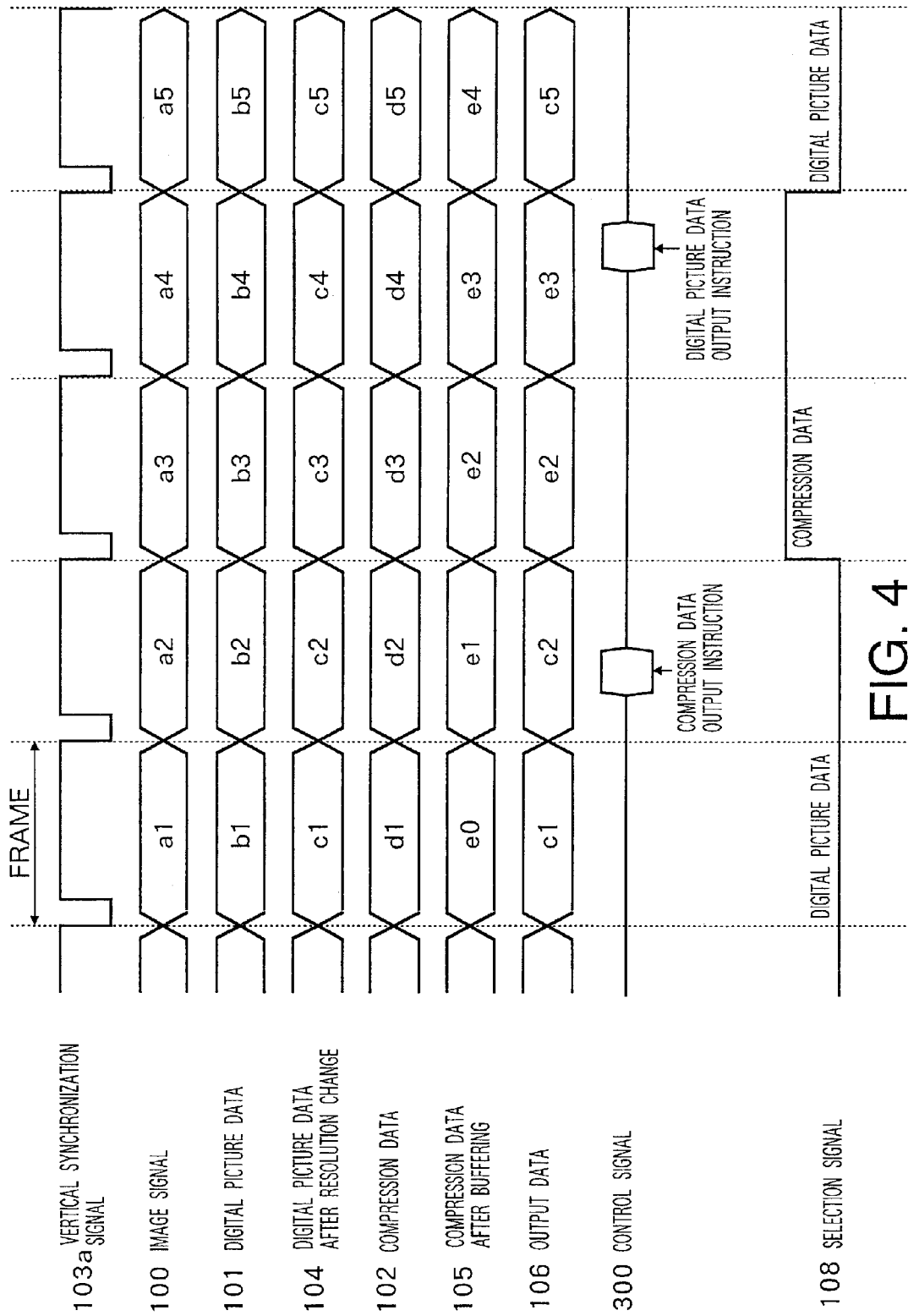
FIG. 4 is a diagram illustrates an example of a signal timing in a camera apparatus according to Embodiment 1.

FIG. 4 is a diagram illustrating an example of a signal timing in a camera apparatus according to Embodiment 1. In FIG. 4, the horizontal axis represents time. In FIG. 4, signals identical to those in FIG. 1 will be assigned the same codes.

In FIG. 4, one cycle of a vertical synchronization signal 103a is called a frame. In this example, imaging device outputs image signal 100 in synch with vertical synchronization signal 103a to image signal processor 12 as illustrated in frames a1 to a6.

Image signal processor 12 performs A/D conversion and color conversion and such on image signal 100 to generate digital picture data 101 consisting of luminance data and color-difference data and such, which is then output to compressor 13 and to resolution changer 16 in parallel, as shown in frames b1 to b6.

Compressor 13 compresses digital picture data 101 by for example a JPEG scheme and outputs compression data 102 to buffer 17 as illustrated in frames d1 to d6. Normally, compression data 102 that compressor 13 outputs does not generate at a constant pace in time but on a burst basis. So buffer 17 buffers compression data 102 over the period of one frame and, as illustrated in frames e0 to e5, outputs burst-generated compression data 102 to output 14 at a pace constant in time.

Resolution changer 16 reduces the resolution of digital picture data 101 and generates new digital picture data 104 with a reduced data volume, which is then output to output 14 as illustrated in frames c1 to c6.

Following the instruction of choice signal 108 provided from control interface 18 that has received control signal 300 from CPU 3, output 14 chooses either one of digital picture data 104 after resolution change and compression data 105 after buffering, which is then output as output data 106.

Here control interface 18 outputs the instruction of control signal 300 received from CPU 3 to output 14 as choice signal 14 in synch with vertical synchronization signal 103.

As thus described, according to camera 1 of Embodiment 1, in case digital picture data 104 is output from camera 1, continuous digital picture data 104 in synch with synchronization signal 103 can be obtained, which can be handled as live moving picture data.

In addition, according to camera 1 of Embodiment 1, with buffer 17 provided, compression data 102 is buffered over the period of one frame, and compression data 102 that generates on a burst basis is output to output 14 at a constant pace in time, and so when compression data 105 is output from camera 1, continuous compression data 105 in synch with synchronization signal 103 can be obtained, which, provided for instance that the compression scheme is JPEG, can be handled as motion JPEG data.

Figure 5:
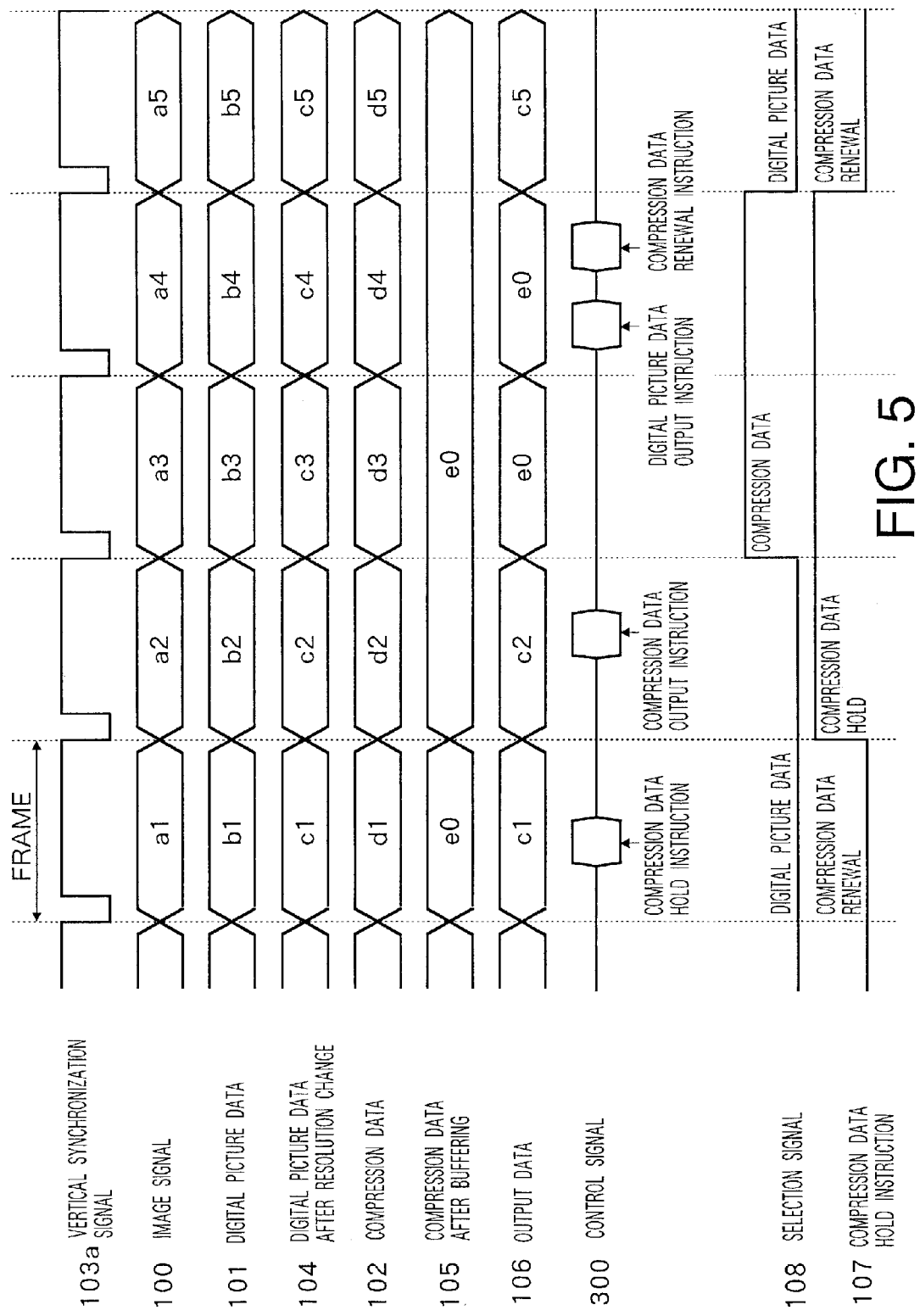
FIG. 5 is a diagram illustrates another example of a signal timing in a camera apparatus according to Embodiment 1.

FIG. 5 is a diagram illustrating another example of a signal timing in a camera apparatus according to Embodiment 1. In FIG. 5, the horizontal axis represents time. In FIG. 5, signals identical to those in FIG. 1 are assigned the same codes, and their detailed explanations are omitted.

Control interface 18 outputs the instruction of control signal 300 received from CPU 3 to compressor 13 as compression data hold instruction signal 107 in synch with vertical synchronization signal 103a.

Upon being instructed to hold the compression data through compression data hold instruction signal 107, compressor 13 stops outputting compression data 102 and stops renewing compression data 105 memorized in buffer 17. In addition, upon being instructed to renew compression data, compressor 13 starts outputting compression data 102 and starts renewing compression data 105 memorized in buffer 17.

As thus described, according to camera 1 of Embodiment 1, compressor 13 can optionally stop and start renewing compression data memorized in buffer 17 by compression data hold signal 107, and so compression data 105, in which one screen of a moment of option is compressed, can be held by external instruction from CPU 3 and such. Accordingly, for example at the time of filming a still picture, it is possible to compress a specified filmed picture and thereafter hold this compression data and transfer this compression data at a time point of option.

In this Embodiment 1, compressor 13 and buffer 17 are in constant operation; however, such configuration is also possible where these parts operate when output 14 chooses to output compression data 105. By this means power consumption can be minimized while camera 1 outputs digital picture data 104.

Moreover, compressor 13 needs to perform control in a way that makes the code volume of compression data 102 obtained by compressing one screen page smaller than a data volume that can be output from output data 106 over the period of one frame. However, such configuration is also possible where, if the data volume of compression data 102 exceeds a data volume that can be output from output data 106 over one frame period, a flag is provided in control interface 18 to indicate an error, so as to perform error notification to CPU through this flag.

Embodiment 2

A case will be described here with Embodiment 2 where a camera apparatus according to the present invention is incorporated into a communication terminal apparatus with picture filming and image transmission/reception functions.

Figure 6:
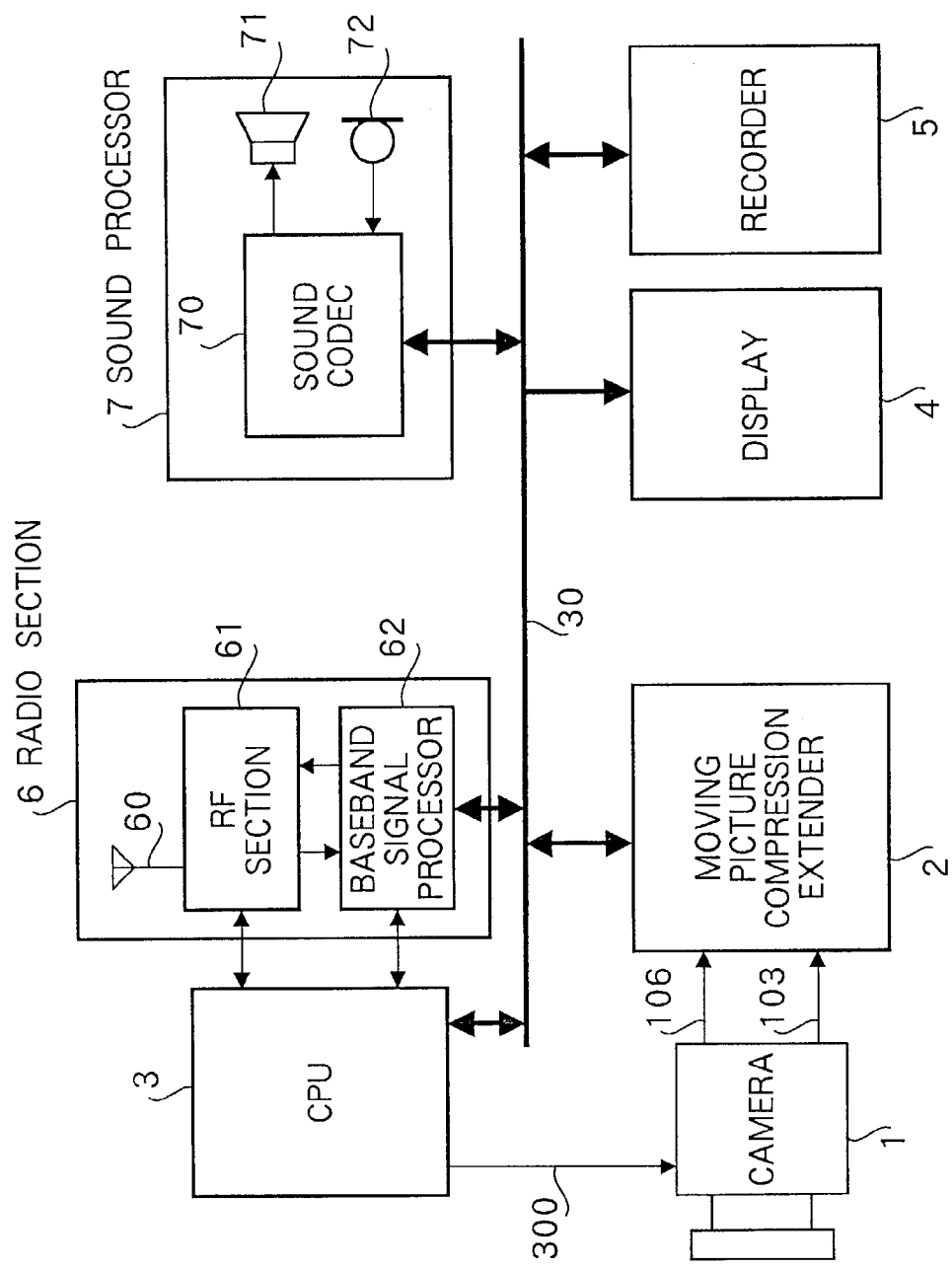
FIG. 6 is a block diagram showing a configuration of a communication terminal apparatus according to Embodiment 2 of the present invention.

FIG. 6 is a block diagram showing a configuration of a communication terminal apparatus according to Embodiment 2 of the present invention. In FIG. 6, parts and signals identical to those in FIG. 1 are assigned the same codes, and their detailed explanations are omitted.

A communication terminal is composed of camera 1, moving picture compression extender 2, CPU 3, display 4, recorder 5, radio section 6 that transmits/receives picture data and voice data in radio frequency, sound processor 7 that inputs/outputs sound data, and bus 30 that connects each part.

In radio section 6, antenna 60 transmits/receives a radio signal. RF section 61 down-converts a received signal to a baseband frequency and then outputs it to baseband signal processor 62, while up-converting a transmission signal output from baseband signal processor 62 into radio frequency and then outputting it to antenna 60. Baseband signal processor 62 demodulates the received signal output from RF section 61 and obtains a picture coding signal or sound coding signal (hereinafter "baseband signal"), while modulating the baseband signal and obtaining a transmission signal.

Sound processor 7 encodes a sound signal into sound coding data and is composed of sound codec 70 that decodes a sound decoding signal into a sound signal, and speaker 71 that outputs the sound signal, and microphone 72 that receives sound and outputs a sound signal.

The basic operation of the communication terminal apparatus of Embodiment 2 will be described. In terms of reception, in radio section 6, a received signal is down-converted and demodulated to obtain a baseband signal, which is then output to CPU 3.

By the instruction of CPU 3, when the baseband signal output from baseband signal processor 62 is a sound coding signal, this sound coding signal is output to codec 70. Sound codec 70 decodes the sound coded signal into a sound signal, which is then output from speaker 71. On the other hand, when the baseband signal is a moving picture coded signal, this moving picture coded signal is output to moving picture compression extender 2. Moving picture compression extender 2 decodes the moving picture coded signal and generates moving picture data, which is then output to display 4.

In terms of transmission, CPU 3 outputs a sound coded signal that is output from sound codec 70 to baseband signal processor 62 as a transmission signal, or outputs a moving picture coded signal that is output from moving picture compression extender 2 to baseband signal processor 62 as a transmission signal.

Next, data output from camera 1 in a communication terminal apparatus according to Embodiment will be described.

As described in above Embodiment 1, from camera 1, digital picture data corresponding to moving pictures having for instance a CIF resolution and compression data corresponding to still pictures having for instance resolution up to VGA can be obtained as the same output data 106, that is to say, by using the same signal line and at the same signal timing, thereby enabling bi-directional moving picture communication functions and still picture filming functions.

By this means, without regard to the type of output data 106 from camera 1 being digital picture data or compression data, it is possible to unify the circuit configuration and control on the data receiver side (moving picture compression extender 2), and accordingly, it is possible to reduce the circuit scale and simplify the circuit control.

In addition, when camera 1 outputs digital picture data, the data transfer speed is moderated to save power consumption, and meanwhile, at the communication terminal, moving picture data of adequate resolution and compression data of higher resolution than moving picture data can be obtained through the same signal line at the same signal timing.

Embodiment 2 has been described using a wireless communication terminal apparatus as an example; nevertheless, a camera apparatus according to the present invention is applicable to use with mobile telephones, mobile TV telephones, and mobile stations such as communication terminals with computer functions in mobile communication systems, or with cable-connected stationary telephones and TV telephones, and furthermore with information terminals with TV receivers, computers, and computer functions.

As explained above, according to the present invention, it is possible to input digital picture data that is output from an image signal processor into a pathway with a compressor and into a pathway without a compressor in parallel, and at an output connected to the both pathways choose between compression data input from one pathway with a compressor and non-compression data input from another pathway and output to outside through the same signal line at the same signal timing. By this means, both the digital picture data and the compression data are input into an external apparatus through the same signal line at the same signal timing, so that there is no need to provide separate circuits for receiving digital picture data and compression data. Consequently, it is possible to unify the circuit configuration and circuit control of external apparatus, so that the circuit scale can be reduced and the circuit control can be simplified.

The present specification is based on Japanese Patent Application No. 2001-130622 filed on Apr. 27, 2001, entire content of which is expressly incorporated herein for reference.

INDUSTRIAL APPLICABILITY

The present invention relates to a camera apparatus and suits for use with a picture communication apparatus comprising still picture filming functions and moving picture filming and communication functions such as in TV telephones. Furthermore, the present invention is suitable for use with an electronic apparatus comprising the above camera apparatus typified by picture communication apparatus.

The invention claimed is:
1. A camera apparatus comprising:
an imaging section that outputs a filmed object as an image signal;

an image signal processing section that converts the image signal output from said imaging section into digital picture data;

a compression section that generates compression data in which the converted digital picture data is compressed, and outputs the compression data in accordance with a compression data renewal instruction and stops outputting the compression data in accordance with a compression data hold instruction;

a buffer section that memorizes the compression data output from the compression section;

a synchronization signal generating section that supplies a synchronization signal;

an output section that, in accordance with a compression data output instruction received during output of the digital picture data, stops outputting the digital picture data while selecting the compression data memorized in the buffer section and outputting the selected compression data from said output section in synch with the synchronization signal, and that, in accordance with a digital picture data output instruction received during the output of the compression data, stops outputting the compression data while selecting the digital picture data converted in the image signal processing section and outputting the selected digital picture data from said output section in synch with the synchronization signal; and an instruction section that issues the compression data hold instruction and the compression data output instruction when the digital picture data is output from the output section in accordance with the digital picture data output instruction, and issues the compression data renewal instruction and the digital picture data output instruction when the compression data is output from the output section in accordance with the compression data output instruction.

2. The camera apparatus according to claim 1, wherein the buffer section holds one frame period of the compression data output from said compression section and then outputs the compression data to said output section at a regular pace in time.

3. An electronic apparatus with a camera apparatus, said camera apparatus comprising:

an imaging section that outputs a filmed object as an image signal;

an image signal processing section that converts the image signal output from said imaging section into digital picture data;

a compression section that generates compression data in which the converted digital picture data is compressed, and outputs the compression data in accordance with a compression data renewal instruction and stops outputting the compression data in accordance with a compression data hold instruction;

a buffer section that memorizes the compression data output from the compression section;

a synchronization signal generating section that supplies a synchronization signal;

an output section that, in accordance with a compression data output instruction received during output of the digital picture, stops outputting the digital picture data while selecting the compression data memorized in the buffer section and outputting the selected compression data from said output section in synch with the synchronization signal, and that, in accordance with a digital picture data output instruction received during output of the digital picture data, stops outputting the compression data while selecting the digital picture data converted in the image signal processing section and outputting the selected digital picture data from said output section in synch with the synchronization signal; and an instruction section that issues the compression data hold instruction and the compression data output instruction when the digital picture data is output from the output section in accordance with the digital picture data output instruction, and issues the compression data renewal instruction and the digital picture data output instruction when the compression data is output from the output section in accordance with the compression data output instruction.

4. A data transfer method comprising the steps of:

outputting a filmed object as an image signal;

converting the output image signal into digital picture data;

generating compression data in which the converted digital picture data is compressed;

in accordance with a compression data hold instruction received at a predetermined timing, stopping outputting the generated compression data to a buffer, and, in accordance with a compression data renewal instruction received at a predetermined timing, outputting the generated compression data to a buffer;

memorizing the output compression data in the buffer;

supplying a synchronization signal;

in accordance with a compression data output instruction received during output of the digital picture data, stopping outputting the digital picture data while selecting the compression data memorized in the buffer and outputting the selected compression data in synch with the synchronization signal, and, in accordance with a digital picture data output instruction received during output of the compression data, stopping outputting the compression data while selecting the converted digital picture data and outputting the selected digital picture data in synch with the synchronization signal; and issuing the compression data hold instruction and the compression data output instruction when the digital picture data is output in accordance with the digital picture data output instruction, and issuing the compression data renewal instruction and the digital picture data output instruction when the compression data is output in accordance with the compression data output instruction.

* * * * *